US010522237B2

(12) United States Patent
Pillay

(10) Patent No.: US 10,522,237 B2
(45) Date of Patent: Dec. 31, 2019

(54) LOW POWER VLSI DESIGNS USING CIRCUIT FAILURE IN SEQUENTIAL CELLS AS LOW VOLTAGE CHECK FOR LIMIT OF OPERATION

(71) Applicant: Austemper Design Systems Inc., Austin, TX (US)

(72) Inventor: Sanjay Pillay, Austin, TX (US)

(73) Assignee: Mentor Graphics Corporation, Wilsonville, OR (US)

(*) Notice: Subject to any disclaimer, the term of this patent is extended or adjusted under 35 U.S.C. 154(b) by 0 days.

(21) Appl. No.: 15/288,912

(22) Filed: Oct. 7, 2016

(65) Prior Publication Data

US 2017/0212972 A1 Jul. 27, 2017

Related U.S. Application Data

(60) Provisional application No. 62/202,278, filed on Aug. 7, 2015.

(51) Int. Cl.
*G06F 17/50* (2006.01)
*H03K 19/21* (2006.01)
(Continued)

(52) U.S. Cl.
CPC .... *G11C 29/12015* (2013.01); *G06F 17/5009* (2013.01); *G06F 17/5022* (2013.01);
(Continued)

(58) Field of Classification Search
CPC ............ G06F 17/5009; G06F 17/5045; H03K 19/0008; H03K 19/21
(Continued)

(56) References Cited

U.S. PATENT DOCUMENTS 3,221,310 A * 11/1965 Reach, Jr. ........... G06F 11/1016
178/23 R
3,226,682 A * 12/1965 Levinthal et al. ........ G06F 7/06
235/454
(Continued)

FOREIGN PATENT DOCUMENTS

JP 33909592 A 7/1994

OTHER PUBLICATIONS

Katz, Sequential Logic, Computer Science 150: Components and Design Techniques for Digital Systems, Fall 2000, p. 1-46, EECS Instructional and Electronics Support, University of California, Berkeley, CA.
(Continued)

*Primary Examiner* — Sun J Lin
(74) *Attorney, Agent, or Firm* — Mentor Graphics Corporation

(57) ABSTRACT

Low power very large scale integrated (VLSI) designs using a circuit failure in sequential cells as low voltage check for limit of operation of a design are provided. One such method involves the adding a plurality of bits for sequential elements in the design including sets of flip-flops, RAMs, ROMs and register files to add parity or single error correct and double error detect mechanism, a method to detect the parity errors or a single bit error and a double bit error in the sequential elements, starting at a voltage of operation at a nominal value and gradually lowering voltage setting till a first error is detected in the sequential elements, increasing the voltage of operation by predetermined step above a voltage of first fail to achieve an optimal voltage setting of a correct operation of the design, storing this optimal voltage setting in anon-volatile memory for a subsequent use.

16 Claims, 6 Drawing Sheets

(51) Int. Cl.
  *H03K 19/00* (2006.01)
  *G11C 29/12* (2006.01)
  *G11C 29/54* (2006.01)
  *G11C 29/52* (2006.01)
  *G11C 11/412* (2006.01)

(52) U.S. Cl.
  CPC ........ *G06F 17/5045* (2013.01); *G11C 11/412* (2013.01); *G11C 29/52* (2013.01); *G11C 29/54* (2013.01); *H03K 19/0008* (2013.01); *H03K 19/21* (2013.01); *G06F 2217/70* (2013.01)

(58) Field of Classification Search
  USPC .......................................... 716/106, 109, 133
  See application file for complete search history.

(56) References Cited

U.S. PATENT DOCUMENTS

| | | | | |
|---|---|---|---|---|
| 4,507,783 | A | * | 3/1985 | Austin et al. ........... H04L 7/048 714/801 |
| 4,670,876 | A | * | 6/1987 | Kirk .................... G06F 11/2215 714/703 |
| 4,905,188 | A | * | 2/1990 | Chuang et al. ..... G06F 12/0804 711/128 |
| 4,982,360 | A | * | 1/1991 | Johnson et al. .......... G06F 8/66 711/108 |
| 5,404,543 | A | * | 4/1995 | Faucher et al. ....... G06F 1/3215 713/323 |
| 5,452,429 | A | | 9/1995 | Fuoco et al. |
| 5,752,034 | A | | 5/1998 | Srivastava et al. |
| 6,009,547 | A | | 12/1999 | Jaquette et al. |
| 6,982,575 | B2 | | 1/2006 | Stong |
| 7,149,945 | B2 | | 12/2006 | Brueggen |
| 7,173,867 | B2 | * | 2/2007 | Terzioglu ............. G11C 29/848 365/189.05 |
| 7,181,485 | B1 | | 2/2007 | Lau et al. |
| 7,275,200 | B2 | | 9/2007 | Leung |
| 7,640,533 | B1 | | 12/2009 | Lottero et al. |
| 8,091,010 | B2 | | 1/2012 | Yim |
| 8,255,765 | B1 | | 8/2012 | Yeo et al. |
| 8,464,281 | B2 | | 6/2013 | Mebane, III |
| 2005/0289261 | A1 | | 12/2005 | White et al. |
| 2012/0240087 | A1 | | 9/2012 | Chang |
| 2015/0039844 | A1 | | 2/2015 | Kao et al. |

OTHER PUBLICATIONS

Nisan et al, Chapter 3: Sequential Logic, The Elements of Computing Systems: Building a Modern Computer from First Principles, 2005, p. 41-55, The MIT Publishing, Cambridge, MA.
Arm, Ahb CPU Wrappers Technical Reference Manual, 2001 and 2003, p. 1-94, Issue A-D, ARM Limited, Cambridge, England, UK.
Bahukhandi, Metastability, Advanced Logic Design and Switching Theory, Jul. 2009.

* cited by examiner

LOW POWER VLSI DESIGNS USING CIRCUIT FAILURE IN SEQUENTIAL CELLS AS LOW VOLTAGE CHECK FOR LIMIT OF OPERATION

CROSS-REFERENCE TO RELATED APPLICATIONS

This application claims priority from U.S. Provisional Application No. 62/202,278, entitled "LOW POWER VLSI DESIGNS USING CIRCUIT FAILURE IN SEQUENTIAL CELLS AS LOW VOLTAGE CHECK FOR LIMIT OF OPERATION", which was filed on Aug. 7, 2015, and which is incorporated herein by reference in its entirety.

TECHNICAL FIELD OF THE INVENTION

The present disclosure pertains generally to Very Large Scale Integration (VLSI) designs where power consumption is critical for the end application, and more particularly, relates to designs in which the circuits operate at an optimally low voltage. This voltage may be lower than the rated low voltage for the manufacturing process in which the design is fabricated in order to get the lowest power consumption for the circuit. In a preferred embodiment, by measuring the failures in the sequential cells, including flip-flops and memories, while lowering the operating voltage of the circuit until the first failure is observed and then increasing the voltage to adding margin and operating the circuit at this margined voltage to achieve lowest power operation.

BACKGROUND OF THE INVENTION

In battery operated systems such as remote measurement or control devices, battery life is a critical success factor. In order to maximize battery life, the components which make up these systems are designed to minimize the power consumed to perform a function (active power) and also minimize the power when the component is in an in-active state (standby power). VLSI components in these systems are expected to be designed and operated in such a way as to minimize the active and standby power.

Most VLSI devices are designed to operate at a predefined minimum voltage. These devices are then operated within a voltage specification whose low end is the predefined minimum voltage with a predetermined margin. This is done to guarantee the correct operation of all the circuits in the VLSI device. Any VLSI device may have a plurality of voltages, and each of these voltage domains has a voltage range of operation.

There is a variation in the process of manufacturing the VLSI device where the characteristics of the device vary within a range, known as the process variance. The device is often designed to the most stringent of these ranges, and for the lowest voltage of the voltage range. This causes the devices that are not at the most stringent end of the process variance to be highly over-designed, even at the lowest rated voltage range of the process. Since the device was not designed for a voltage range below the lowest rated voltage, the manufacturer of the VLSI device does not guarantee the operation of this device below the lowest voltage in the range, even though the device may be capable of operating at a much lower voltage.

SUMMARY OF THE INVENTION

In one aspect, a method is provided for reducing the voltage at which a design of a digital electronic device is operated. The method comprises (a) providing a design for a digital electronic device; (b) determining the lowest voltage $V_{min}$ at which the design will operate correctly by operating the design at successively lower voltages until a point of failure is reached; and (c) operating the design at $V_{min}$.

In another aspect, a method is provided for determining the highest voltage at which a failure occurs in the VLSI circuit of a digital electronic device equipped with a first voltage regulating circuit and a set of sequential elements. The method comprises (a) performing an initial boot and self-check of the digital electronic device; (b) writing a value into a non-volatile memory in the VLSI circuit during the initial boot; (c) setting the operating voltage of the first circuit with a second circuit based on the value written in the nonvolatile memory in the VLSI circuit; and (d) iteratively lowering the operating voltage of the first circuit by a predetermined amount while the operation of the sequential elements is being monitored by a test circuit until the test circuit detects a failure in the set of sequential elements.

In a further aspect, a method is provided for determining the operating voltage for the VLSI circuit of a digital electronic device equipped with a plurality of sequential elements. The method comprises (a) setting the operating voltage for the device at an initial value; (b) repeating the steps of (i) running a functional test for a boot sequence for the device, and (ii) lowering the operating voltage by a predefined amount, until running the functional test results in at least one error in at least one of the plurality of sequential elements; (c) repeating the steps of (i) increasing the operating voltage by a predefined amount, and (ii) running a functional test for booting the device, until running the functional test results in no errors in any of the plurality of sequential elements; and (d) writing the value of the operating voltage to a volatile memory device.

In still another aspect, a method is provided for adjusting the operating voltage for the VLSI circuit of a digital electronic device equipped with a plurality of sequential elements. The method comprises (a) setting the operating voltage at a value read from a non-volatile memory device; (b) repeating the steps of (i) running a functional test and boot sequence for the device, and (ii) increasing the operating voltage by a predefined amount, until the device passes the functional test and the boot sequence completes with no errors in the plurality of sequential elements.

In yet another aspect, a method is provided for detecting errors in a plurality of flip-flops in a VLSI design. The method comprises grouping the plurality of flip-flops into sets of flip-flops; and, for each set of flip-flops, (a) XORing the inputs of member flip-flops of the set to create a first signal, (b) XORing the outputs of member flip-flops of the set to create a second signal, (c) inputting the first signal into a parity flip-flop associated with the set of flip-flops, (d) comparing the first and second signals, and (e) outputting an error signal if the first and second signals do not match.

In still another aspect, a method is provided for detecting errors in a plurality of flip-flops in a VLSI design containing flip-flops, 1-bit memory devices and 2-bit memory devices. The method comprises (a) receiving first, second and third sets of error signals corresponding, respectively, to the flip-flops, 1-bit memory devices and 2-bit memory devices; (b) ORing the first set of error signals to generate a first check signal; (c) ORing the second set of error signals to generate a second check signal; (d) ORing the third set of error signals to generate a third check signal; (e) inputting the first, second and third check signals into first, second and third parity flip-flops, respectively; (f) comparing the output signal of the first parity flip-flop to the first check signal, and generating an error code indicating an error in the flip-flops if the two signals do not match; (g) comparing the output signal of the second parity flip-flop to the second check signal, and generating an error code indicating an error in the 1-bit memory devices if the two signals do not match; and (h) comparing the output signal of the third parity flip-flop to the third check signal, and generating an error code indicating an error in S 2-bit memory devices if the two signals do not match.

In another aspect, a tangible, non-transient medium is provided having suitable programming instructions recorded therein which, when implemented by one or more computer processors, performs any of the foregoing methods, or performs any step or set of steps contained in any of the foregoing methods.

BRIEF DESCRIPTION OF THE DRAWINGS

For a more complete understanding of the present invention and the advantages thereof, reference is now made to the following description taken in conjunction with the accompanying drawings in which like reference numerals indicate like features.

DETAILED DESCRIPTION OF THE DISCLOSURE

Definitions

Figure 1:
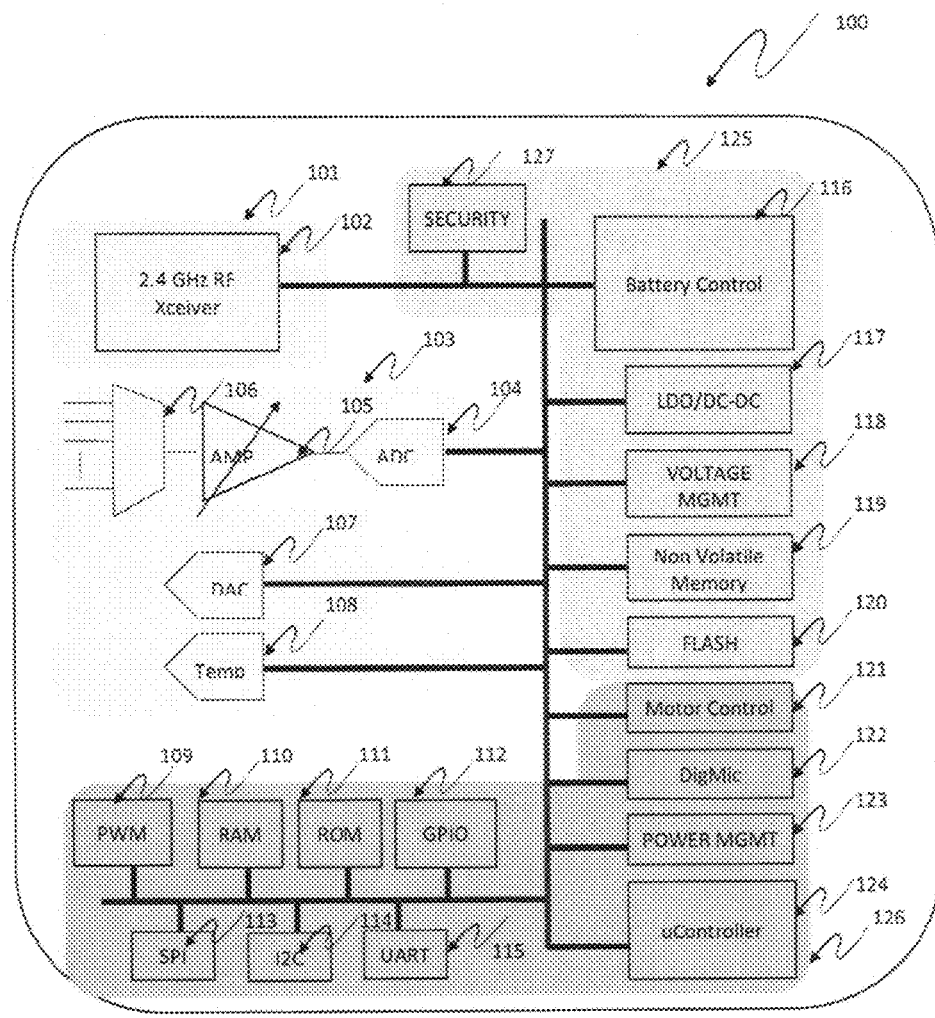
FIG. 1 is a block diagram of a VLSI SoC.
Figure 2:
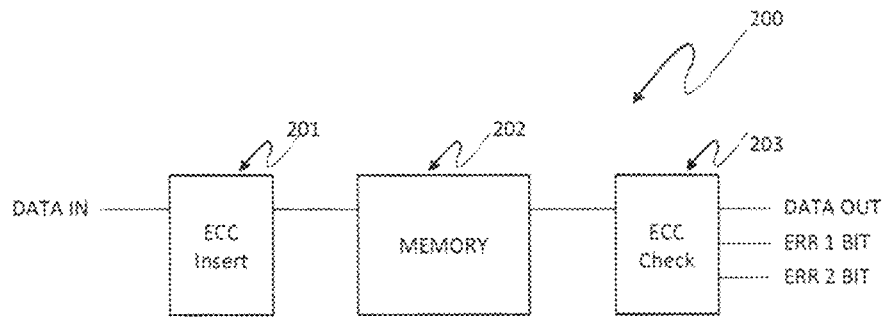
FIG. 2 is a block diagram of the wrapper for the RAMs/RFs.

The following terms as used in this disclosure have the meanings specified below.

"VLSI" refers to very-large-scale integration, that is, the process of creating an integrated circuit (IC) by combining a large number (e.g., hundreds of thousands) of transistors into a single chip.

"Flip-flop" refers to a circuit that has two stable states, and which can be used to store information. Flip-flops serve as the basic storage elements in the designs of many digital electronic devices.

"Failure in time rate" or "FIT rate" refers to the frequency with which an engineered system or component fails. The FIT rate is typically expressed in failures per unit time.

"XOR cell" refers to a logic gate which outputs a value of "true" only when one both inputs are the same.

"XORing" refers to the application of the exclusive OR function to a set of inputs.

"ORing" refers to the application of the non-exclusive OR function to a set of inputs.

"Storage element" refers to an element in a digital electronic device, such as a flip-flop or SRAM, that stores information.

"Wrapper" refers to a subroutine in a computer program or software library whose main purpose is to call another subroutine or to make a system call, with little or no additional computation.

"Self-checking", when used in reference to a circuit, refers to a circuit consisting of a functional circuit which produces encoded output vectors, and a checker, which checks the vectors to determine if an error has occurred.

"Self-check" refers to the process by which the checker in a self-checking circuit determines if an error has occurred.

"RAM" refers to random access memory.

"ROM" refers to read-only memory.

"Sequential element" refers to a flip-flop, synchronous RAM, or latch.

"ECC" refers to an error correction code.

"RF" refers to register file.

"SECDED" refers to single-error correcting and double-error detecting.

"SoC" refers to system on a chip.

The voltage at which a device is operating may be determined through the use of measurement structures that are typically embedded in the device, or through the use of a representative test structure which includes the components used in the design due to the intra chip process variance. However, it is impractical, if not impossible, to use these approaches to specifically analyze and compute the lowest voltage of operation for the individual VLSI device at which a component of the VLSI device fails. Finding the voltage at which each component in the VLSI device fails is a very tedious, and often impossible, task when performed after the device is manufactured. The best way to accomplish the measurement of the failure of the components is to measure the failures in the sequential cells (flip-flops, memories), since these are typically the first sub-components to fail in a design.

In some embodiments of the systems and methodologies disclosed herein, low power VLSI designs (where the lowest power consumption of the VLSI circuit in both the active and standby states is critical), and methods for creating the same, are provided which utilize a first circuit as a controlled voltage regulator circuit. The first circuit may be embedded in the VLSI design, or may be an external circuit. The first circuit is controlled by a second circuit, which may be a state machine or a micro-controller in the VLSI circuit, which sets the operating voltage of the first circuit based on a value written into a nonvolatile memory in the VLSI design. This value is programmed into the non-volatile memory at first boot. The initial boot and self-check occurs at the rated voltage of the manufacturing process and the design point. Subsequently, the operating voltage is lowered in steps (while the on-chip test circuits monitor the correct operation of the sequential elements) until the first failure of a sequential element is detected by the circuit monitors.

In other embodiments of the systems and methodologies disclosed herein, error detection and/or correction wrappers are added to all Random Access Memories (RAMs) and the register files (RFs) such that, during the write to the RAMs and RFs, a ECC code word is generated which may be used to detect single or multiple bit failures. This ECC code word may be implemented as a parity bit, or as a Single Error Correct Double Error Detect (SECDED) circuit and the corresponding check circuit. If a failure occurs in the RAMs or RFs, then on this error is detected on a read.

In further embodiments of the systems and methodologies disclosed herein, an error detection and/or correction wrapper is added to all Read Only Memories (ROMs) such that the ROM words are embedded with either parity or SECDED code words during the ROM builds and the corresponding check circuit for the read of the ROMs. This error is then detected if a failure occurs in the ROM on a read.

In other embodiments of the systems and methodologies disclosed herein, error detection is implemented by adding a parity flip-flop for a plurality of flip-flops such that the D input of the plurality of flip-flops are XORed to generate the D input for the parity flip-flop. The Q output of the plurality of flip-flops is then XORed to generate the expected parity value, and this value is checked with the Q output of the parity flip-flop. An error is generated if the values do not match. A plurality of such error signals are created to cover all the flip-flops in the VLSI design, such that the AND/OR of the created error signal indicates a failure in the flip-flops of the VLSI design.

In further embodiments of the systems and methodologies disclosed herein, an OR is performed on all the error signals generated from the RAMs, RFs, ROMs and flip-flops to indicate a failure in the VLSI design.

In still other embodiments of the systems and methodologies disclosed herein, a first boot flow is provided for the VLSI design, and the voltage regulator is set to a voltage within the normal operating range of the manufacturing process and the design point. A self-check is performed on the memories at the programmed voltage while the circuit error indicator is monitored. At the end of the boot process, if no error is detected, the programmed voltage is lowered by a predetermined step. The foregoing process is then repeated until the first failure is detected. The value of the programmed voltage of the first failure is then recorded in the non-volatile memory on the VLSI circuit.

In other embodiments of the systems and methodologies disclosed herein, a subsequent boot flow is performed for the VLSI design, where the voltage regulator is set to a value which is based on the first fail point from the non-volatile memory. This value includes a margin added for safety, and is compensated for temperature variance while the circuit error indicator is continuously monitored.

The systems and methodologies disclosed herein may be further understood with reference to the particular, non-limiting embodiments illustrated in FIGS. 1-6.

With reference to the block diagram of FIG. 1, an embodiment is depicted of a low power VLSI design technique in accordance with the teachings herein which utilizes circuit failure in sequential elements as a low voltage check for limit of operation. The particular embodiment depicted is a VLSI design which includes a System on a Chip (SoC) 100. The SoC 100 may consist of a plurality of voltage and power islands. In the embodiment depicted, these include RF island 101, analog island 103, a set of blocks grouped for digital core voltage 126, and a set of blocks grouped for nominal voltage 125. Each of these elements operates at a voltage that is independently set by the regulator 117 in the system.

The RF island 101 consists of a 2.4 GHz RF transceiver 102. The analog island consists of analog multiplexer 106, a programmable gain amplifier 105, an analog to digital converter (ADC) 104, a digital to analog converter 107, and a temperature sensor 108. The digital core voltage block 126 consists of a plurality of blocks including random access memory (RAM) 110, read-only memory (ROM) 111, serial peripheral interface (SPI) 113, inter-integrated circuit (I2C) 114, universal asynchronous receiver/transmitter (UART) 115, pulse-width modulator (PWM) 109, general-purpose input/output (GPIO) 112, motor control 121, digital microphone logic 122, a power management unit 123 for the digital microphone logic, and micro controller 124. The nominal voltage block 125 consists of battery control 116, a voltage regulator block 117 consisting of low drop off (LDO) and DC to DC converters, voltage management block 118, non-volatile memory 119 (which includes one-time programmable memory), and security 127 and flash 120 blocks.

In the particular embodiment depicted, the RAM block 110 has an error correction code (ECC) insertion logic inserted in the path of the write data to the RAM 110. Consequently, the width of the RAM 110 is increased (compared to the width of the data being written to the RAM 110) by the number of bits required to implement a ECC code-word. As shown in the system 200 depicted in FIG. 2, the ECC code-word insert 201 is capable of correcting a single bit error and detecting a 2-bit error, along with the RAM shown as memory 202 followed by the ECC check logic 203.

Figure 3:
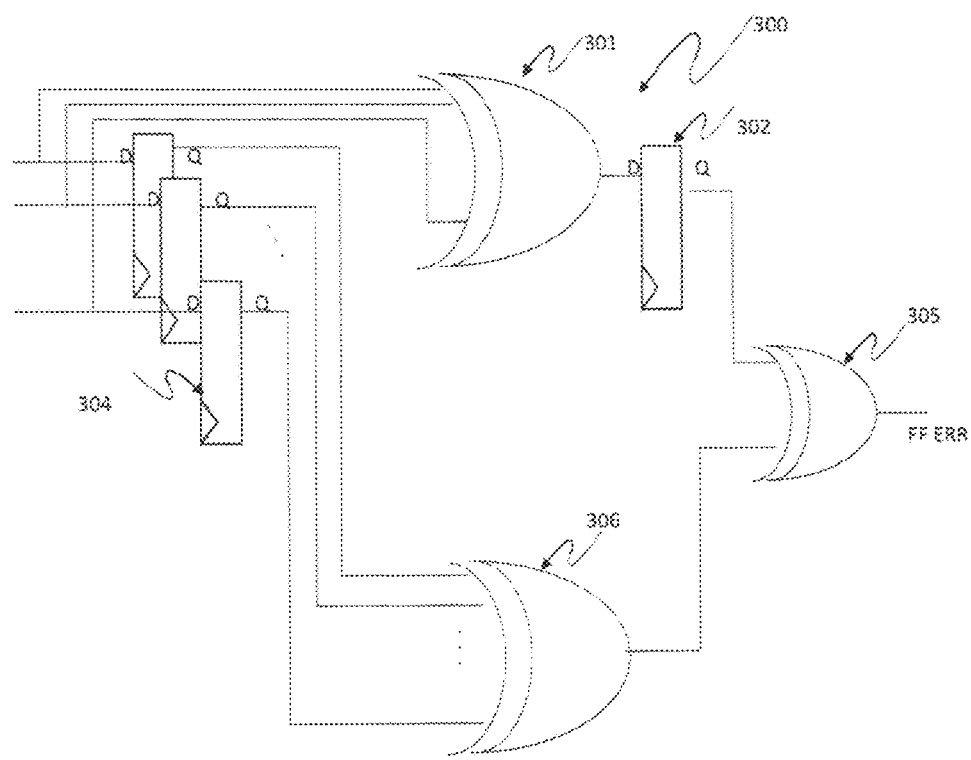
FIG. 3 is a block diagram of the flip-flop bank with the parity flip-flop.

FIG. 3 illustrates one manner in which errors may be detected in the system of FIG. 1 through the use of parity registers. As seen therein, in the particular arrangement 300 depicted, the flip-flops are grouped into sets of flip-flops 304. The inputs to the flip-flops in the set are XORed 301 to create the input to a parity register, here in the form of a parity flip-flop 302. The outputs of the flip-flops in the set are XORed 306 to generate a check signal that is checked 305 with the output of the parity flip-flop 302. If the output of the parity flip-flop 302 does not match the check signal, then an error signal is generated.

Figure 4:
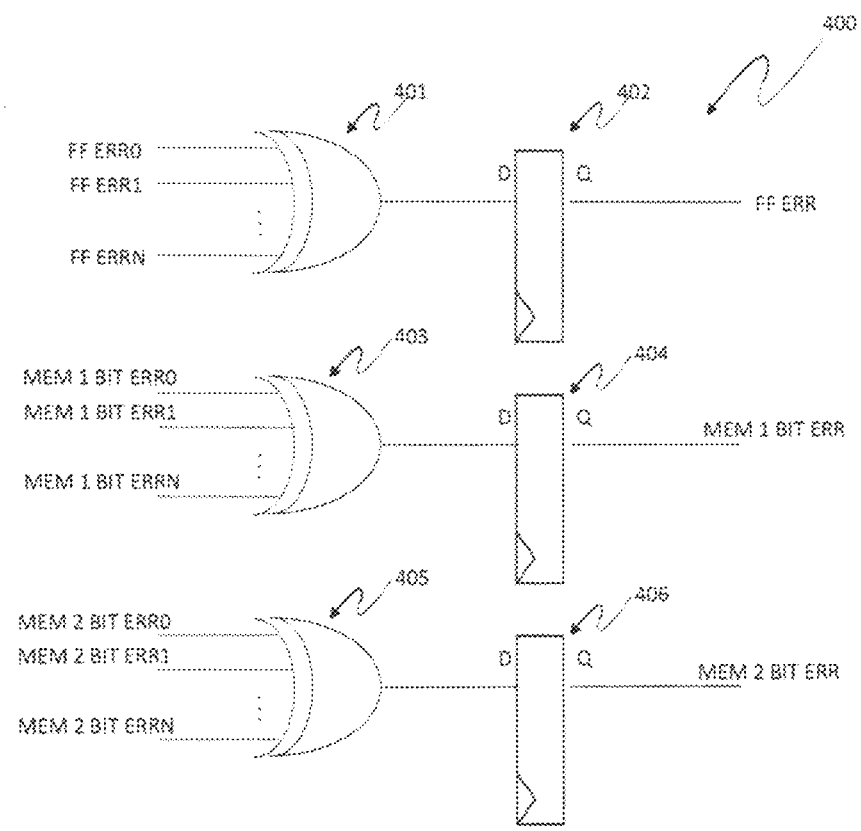
FIG. 4 is a block diagram of the circuit error signal generation

FIG. 4 illustrates one manner in which circuit failure status signals are used to detect the type of circuit failure in the system of FIG. 1. As seen in the system 400 depicted therein, the error signals are grouped into first, second and third sets of error signals corresponding, respectively, to the error signals generated by the flip-flops, the 1-bit memory devices and the 2-bit memory devices. The first set of error signals is XORed 401 to generate a first check signal that is input to parity flip-flop 402. If the output of the parity flip-flop 402 does not match the input check signal, then an error signal is generated indicating an error in the flip-flops. In a similar manner, the second set of error signals is XORed 403 to generate a second check signal that is input to parity flip-flop 404, and if the output of parity flip-flop 404 does not match the respective input check signal, then an error signal is generated indicating an error in the 1-bit memory devices. Likewise, the third set of error signals is XORed 405 to generate a third check signal that is input to parity flip-flop 406, and if the output of parity flip-flop 406 does not match the respective input check signal, then an error signal is generated indicating an error in the 2-bit memory devices. It will thus be appreciated that the foregoing circuit failure status signals may be used to detect the particular type of circuit failure.

Figure 5:
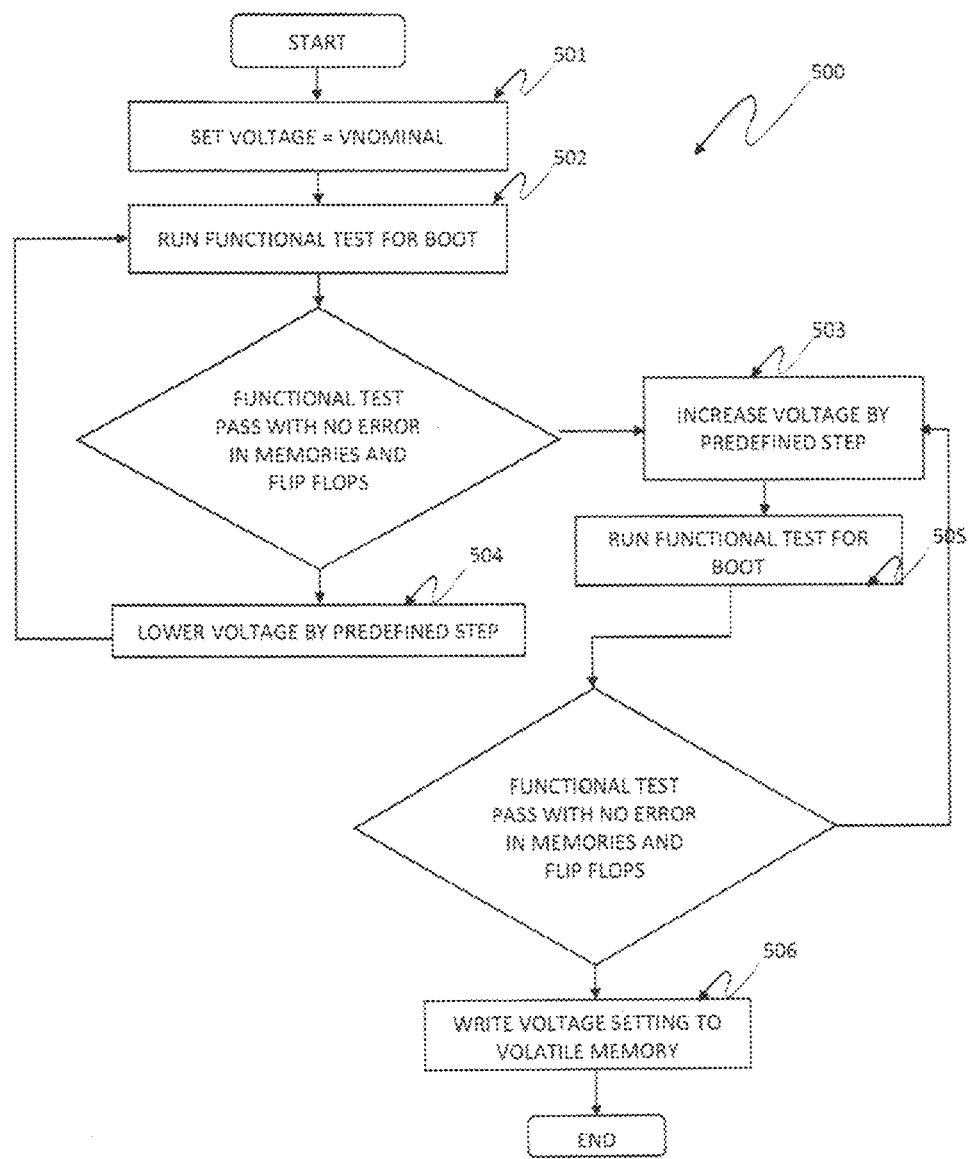
FIG. 5 is a flow chart for the first boot flow.
Figure 6:
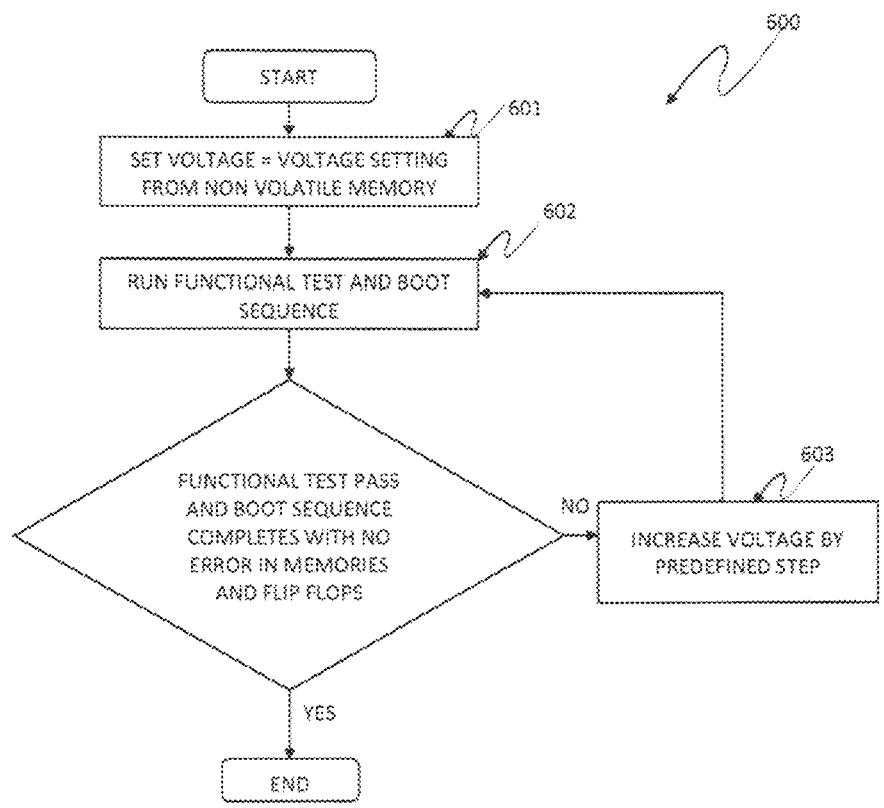
FIG. 6 is a flow chart for the subsequent boot flow

FIGS. 5-6 illustrate two distinct boot flows which may be utilized in the system of FIG. 1. The boot flow of FIG. 5 is a first time boot flow, while the boot flow of FIG. 6 is a normal boot flow.

In the first time boot flow 500 of FIG. 5, the initial voltage for the digital core regulator is set to the nominal process voltage range 501 and a functional test and boot sequence is executed 502, while the circuit failure status signals are monitored continuously. If the functional test and boot sequence passes and there are no circuit failure status signals that are flagged as failures, then the voltage setting is reduced 504 by a (preferably small) predefined amount or step, and the functional test and boot sequence is repeated. This process is followed until either the first functional test failure occurs or the circuit failure status shows a circuit failure. The voltage is then increased 503 by a predetermined value to add additional margin, and the functional test and boot sequence is run again 505. If the functional test fails or the circuit failure status shows a circuit failure, the voltage is increased by a predetermined value to add additional margin 503, and the functional test and boot sequence 505 is repeated till there are no failures. At this stage, the voltage setting is written 506 to the non-volatile memory, and the first time boot is completed.

The normal boot flow 600 of FIG. 6 is the boot process run after the first time boot has been successfully completed. In this boot process, the voltage setting for the digital core voltage is read from the non-volatile memory and used to set the voltage 601 for the digital core voltage blocks. The functional test and boot sequence is run 602 and, if the functional test fails or the circuit failure status shows a circuit failure, the voltage setting is increased 603 by a preset amount, and the functional test and boot sequence is re-executed 602. If there are no failures at a given voltage setting, the boot process is complete with the digital core voltage set to the lowest possible voltage for the circuit to perform as designed. This set value may be lower than process nominal voltage range and the design point for the SoC.

The various methodologies disclosed herein may be implemented by one or more software packages or tools. These software packages or tools will typically include one or more instances of tangible, non-transient medium having suitable programming instructions defined which, when executed by one or more processors, causes the method to be performed. The software packages or tools may be implemented in various format including, for example, as standalone applications or distributed applications.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method comprising:
   providing a design for a digital electronic device;
   creating a circuit wrapper around sequential elements in the design, wherein said circuit wrapper adds a plurality of bits to each sequential element of the sequential elements:
   determining a lowest voltage $V_{min}$ at which the design will operate correctly by operating the design at successively lower voltages until a point at which a failure is reached; and
   operating the design at the $V_{min}$.

2. The method of claim 1, further comprising:
   detecting a correct operation of said each sequential element by utilizing a circuit to read the plurality of bits added to said each sequential element.

3. The method of claim 2, wherein a first voltage at which a point of a failure is reached by operating the design at successively lower voltages is $V_{fail}$, and wherein the $V_{min}$ is obtained by adding a predetermined margin to the $V_{fail}$.

4. The method of claim 1, wherein a first voltage at which a point of a failure is reached is $V_{fail}$, and further comprising:
   storing the $V_{min}$ in a non-volatile memory.

5. The method of claim 4, further comprising:
   restoring the voltage to a value of the $V_{min}$ stored in the non-volatile memory.

6. The method of claim 1, further comprising:
   generating a parity bit for each input bit of a plurality of input bits of the sequential elements in the design through the use of the circuit wrapper, wherein each sequential element of the sequential elements is selected from a group consisting of flip-flops, RAMs, ROMs and register files, and wherein each bit of the parity bits has a value of either an even or an odd parity.

7. The method of claim 6, further comprising:
   checking an output of each sequential element of the sequential elements in the design for a correctness based on an associated parity bit.

8. The method of claim 7, wherein the determining $V_{min}$ includes:
   iteratively lowering the voltage based on the correctness of the output of each sequential element of the sequential elements.

9. The method of claim 8, further comprising:
   increasing the voltage by a predetermined step once the failure is detected based on the correctness of the output of each sequential element of the sequential elements.

10. The method of claim 1, further comprising:
    generating single error correct and double error detect (SECDED) code words for sequential elements in the design, wherein each sequential element of said sequential elements is selected from a group consisting of flip-flops, RAMs, ROMs and register files.

11. The method of claim 10, further comprising:
    checking an output of each sequential element in the design for a correctness based on an associated SECDED code word.

12. The method of claim 11, wherein the determining $V_{min}$ includes:
iteratively lowering the voltage based on the correctness of the output of each sequential element of the sequential elements.

13. The method of claim 12, further comprising:
increasing the voltage by a predetermined step once the failure is detected based on the correctness of the output of each sequential element of the sequential elements.

14. The method of claim 1, wherein the digital electronic device is a very large scale integrated (VLSI) design.

15. A method for detecting errors in a plurality of flip-flops in a very large scale integrated (VLSI) design, the method comprising:
grouping the plurality of flip-flops into sets of flip-flops; and
for each set of flip-flops,
(a) XORing inputs of member flip-flops of said each set to create a first signal,
(b) XORing outputs of said member flip-flops of said each set to create a second signal,
(c) inputting the first signal into a parity flip-flop associated with said each set of flip-flops to generate an output signal,
(d) comparing the output signal of the parity flip-flop and the second signal, and
(e) outputting an error signal if the output signal of the parity flip-flop and the second signal do not match.

16. A method for detecting errors in a plurality of flip-flops in a very large scale integrated (VLSI) design containing flip-flops, 1-bit memory devices and 2-bit memory devices, the method comprising:
receiving a first set, a second set and a third set of error signals corresponding to the flip-flops, the 1-bit memory devices and the 2-bit memory devices, respectively;
ORing the first set of error signals to generate a first check signal;
ORing the second set of error signals to generate a second check signal;
ORing the third set of error signals to generate a third check signal;
inputting the first check signal, the second check signal and the third check signal into a first parity flip-flop, a second parity flip-flop and a third parity flip-flop, respectively;
comparing an output signal of the first parity flip-flop to the first check signal, and generating an error code indicating an error in the flip-flops if the output signal and the first check signal do not match;
comparing an output signal of the second parity flip-flop to the second check signal, and generating an error code indicating an error in the 1-bit memory devices if an output signal and the second check signal do not match; and
comparing the output signal of the third parity flip-flop to the third check signal, and generating an error code indicating an error in the 2-bit memory devices if the output signal and the third check signal do not match.

* * * * *